United States Patent [19]

Sargent

[11] Patent Number: 4,528,630

[45] Date of Patent: Jul. 9, 1985

[54] AUTOMATIC REGISTRATION CONTROL METHOD AND APPARATUS

[75] Inventor: Jack Sargent, Silver Spring, Md.

[73] Assignee: OAO Corporation, Greenbelt, Md.

[21] Appl. No.: 418,183

[22] Filed: Sep. 14, 1982

[51] Int. Cl.[3] .............................................. G06F 15/46

[52] U.S. Cl. .................................... 364/469; 364/559; 226/30; 101/181; 250/548; 250/557; 250/561; 340/675

[58] Field of Search ................ 364/469, 559; 101/181, 101/248; 226/27, 28, 29, 30, 31; 340/675; 250/548, 559, 561

[56] References Cited

U.S. PATENT DOCUMENTS

| | | | |
|---|---|---|---|
| 2,768,827 | 10/1956 | Noble | 101/181 |
| 3,015,266 | 1/1962 | Anderson et al. | 101/211 |
| 3,068,787 | 12/1962 | Dall'oglio et al. | 101/181 |
| 3,084,621 | 4/1963 | Guastavino | 101/181 |
| 3,102,471 | 9/1963 | Auer et al. | 101/181 |
| 3,264,983 | 8/1966 | Lewis et al. | 101/181 |
| 3,399,306 | 8/1968 | Guastavino | 250/548 |
| 3,468,201 | 9/1969 | Adamson et al. | 83/74 |
| 3,594,552 | 7/1971 | Adamson et al. | 235/92 |
| 3,601,587 | 8/1971 | Thiede | 235/92 |
| 3,624,359 | 11/1971 | Roote | 235/61.11 |
| 3,653,322 | 4/1972 | Richardson | 101/248 |
| 3,701,464 | 10/1972 | Crum | 101/181 |
| 3,783,293 | 1/1974 | Gold et al. | 250/548 |
| 3,896,377 | 7/1975 | Richardson | 324/161 |
| 3,963,902 | 6/1976 | Dowd | 235/92 |
| 3,976,947 | 8/1976 | Guyot et al. | 328/108 |
| 4,003,660 | 1/1977 | Christie, Jr. et al. | 356/178 |
| 4,142,105 | 2/1979 | Erdmann | 250/548 |
| 4,264,957 | 4/1981 | Pautzke | 364/469 |
| 4,318,176 | 3/1982 | Stratton et al. | 364/469 |
| 4,401,024 | 8/1983 | Frentress | 101/248 |

FOREIGN PATENT DOCUMENTS

| | | | |
|---|---|---|---|
| 157369 | 12/1981 | Japan | 101/181 |

OTHER PUBLICATIONS

"Automatic Registration in an Electron-Beam Lithographic System", Davis, D. E. et al., Solid State Technology, Aug. 1978, pp. 61-64.

*Primary Examiner*—Jerry Smith
*Assistant Examiner*—John R. Lastova
*Attorney, Agent, or Firm*—Shapiro and Shapiro

[57] ABSTRACT

Registration in a multi-color printing press is controlled by printing spaced groups of registration marks on a running web, each group comprising a plurality of spaced reference color marks and a plurality of controlled color marks, each being midway between a different pair of reference marks. A computer-based control system produces quantities corresponding to the leading and the trailing edges of each mark, which are averaged to determine the midpoint of the mark, thereby avoiding errors due to differences in reflectance. Registration is determined from other quantities that measure the separations between marks. Data is collected for a predetermined number of successive marks. The collected data is analyzed to determine the start of a group, and the data corresponding to marks of that group is then analyzed to detect registration. After a correction is performed, the system idles until a predetermined length of the web sufficient to enable the effect of the correction to be observed passes the sensor.

39 Claims, 7 Drawing Figures

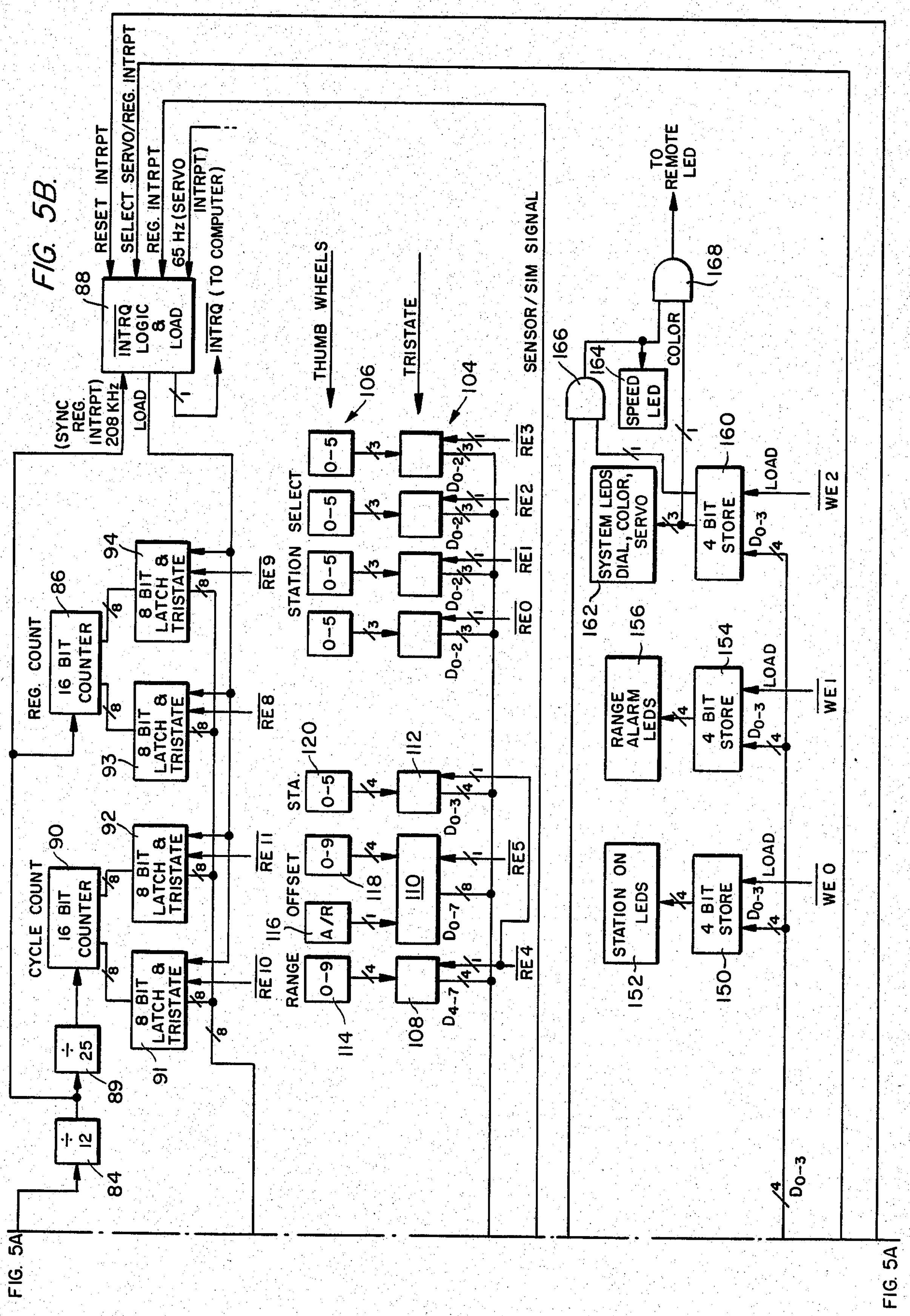
FIG. 5B.
RESET INTRPT
SELECT SERVO/REG. INTRPT
REG. INTRPT
65 Hz (SERVO INTRPT)
INTRQ (TO COMPUTER)
INTRQ LOGIC & LOAD
(SYNC REG. INTRPT) 208 KHz
LOAD
REG. COUNT
16 BIT COUNTER
CYCLE COUNT
16 BIT COUNTER
8 BIT LATCH & TRISTATE
÷ 12
÷ 25
RE 8
RE 9
RE 10
RE 11
THUMB WHEELS
TRISTATE
SENSOR/SIM SIGNAL
STATION SELECT
0-5
RE0
RE1
RE2
RE3
RE4
RE5
STA.
OFFSET
RANGE
0-9
A/R
110
D0-2
D0-3
D0-7
D4-7
TO REMOTE LED
COLOR
SPEED LED
SYSTEM LEDS DIAL, COLOR, SERVO
RANGE ALARM LEDS
STATION ON LEDS
4 BIT STORE
LOAD
WE 0
WE 1
WE 2
FIG. 5A
FIG. 5A

AUTOMATIC REGISTRATION CONTROL METHOD AND APPARATUS

BACKGROUND OF THE INVENTION

This invention relates generally to registration control methods and apparatus, and more particularly to a method and apparatus for automatic registration control of operations performed on a moving web by successive stations in a multi-station processing system.

In some types of multi-station processing systems wherein successive processing operations are performed by different processing stations on a running web of material, it is necessary that the locations on the material at which the successive processing operations are performed have a predetermined relationship to one another. In multi-color printing, for example, each of several printing stations applies a different color ink in a predetermined pattern to a substrate, e.g., paper that moves through the printing press. The patterns are superimposed to form the desired image, and the shape of each pattern and the density of ink deposited by each station are selected so that when the colors overlap a complimentary color is produced. Although all of the colors of the visible spectrum can be formed using the three primary colors red, yellow and blue, printing presses for high quality multi-color printing may, in general, have five printing stations. Three are used for the primary colors; one is used for black; and one is available for a special color that may be difficult to obtain by combining the three primary colors or where it is difficult to maintain the color match during an entire run. To obtain high quality resolution in the final product, it is necessary that the patterns printed by each station be precisely aligned. This alignment is called registration.

Registration control, which may be either manual or automatic (or perhaps both) involves controlling the various stations so as to achieve and maintain proper alignment. In a printing press, each station may print, along the waste edge of the paper, registration marks, e.g., crosshairs, corresponding to the location of each color. If registration is correct, the crosshairs will overlap. If a particular color is offset, an operator can manually energize a motor which shifts the relative position (or phase) of the rotating print platen of that station with respect to the other stations until registration is obtained. One color, selected arbitrarily, is generally designated as a reference color and the other stations are aligned to it. Once the alignment has been set, the press is run. Since misalignment may occur during a run, the operator must check the alignment from time to time. Misalignment must be detected with the press in operation, and the offset must be estimated visually. Although an experienced operator may be able to estimate the offset with an acceptable degree of accuracy, he may have to make several adjustments before an acceptable product is obtained. Moreover, it is desirable to maintain precisely an alignment of the order of 0.002 inch, for example, which is beyond the capability of most operators.

Generally, automatic registration systems may be one of two types—those that measure the actual position of a work-applying member at each station and adjust the positions of the members with respect to each other or with respect to some reference, e.g., a reference mark on a workpiece that moves from one station to the next, or those that compare the locations on the workpiece at which each processing operation is performed and adjust the work-applying members until the locations of the processing operations have a predetermined relationship, without regard to the actual positions of the work-applying members. In multi-station printing presses, systems of the first type may employ magnetic sensors for measuring the angular positions of the rotating print platens and photoelectric sensors for detecting the locations of reference marks on the workpiece. Systems of the second type may employ only photoelectric sensors for detecting the positions of spaced registration marks applied to the workpiece by each station.

The registration accuracy obtainable with systems of the first type is dependent upon the accuracy with which the positions of the work-applying members can be determined and the accuracy with which their positions relative to the reference can be established. Moreover, these systems assume that the locations of the processing operations on the workpiece are precisely determined by the positions of the work-applying members. In printing presses, for example, misalignment of the printing plates on the rotatable print platens, mechanical wear, or misplacement of the sensors may all produce registration errors. Systems of the second type may avoid some of these problems. However, their accuracy is still limited by the accuracy with which the registration mark positions on the workpiece can be determined.

In multi-station printing presses, registration marks may be sensed by projecting a spot beam of light onto the running web and detecting changes in the amount of light reflected as the marks pass through the beam. Two or more such sensors may be employed for detecting the positions of two or more side-by-side marks. To avoid displacement errors, the sensitivity of each sensor must be held constant, and care must be taken to avoid light from one sensor spilling over to an adjacent sensor and causing interference. Moreover, since different color marks reflect different amounts of light, fixed threshold sensors will produce output signals at different relative positions of the marks with respect to the sensors, causing errors in the determinations of mark positions. One known system attempts to avoid this by using a first sensor to measure the contrast ratio as each mark passes through its light beam and uses this ratio for automatically setting the threshold of a spaced second sensor employed for detecting mark position. This approach still requires that the sensitivities of the sensors be held constant and that interference between the sensors be avoided.

Known automatic registration systems also have other problems. Dimensional changes in the running web occasioned by stretching and shrinking of the web as it passes through the press cause the spacings between registration marks to change and may produce errors. Moreover, there is a time lag between the time at which a registration correction is made and the time at which the effect of the correction can be detected, during which the system must idle. This time lag is dependent upon the operating parameters of the processing system, e.g., operating speed, which may be variable. Accordingly, problems arise in synchronizing automatic registration systems to processing system parameters.

SUMMARY OF THE INVENTION

The invention provides registration control systems and methods that avoid the foregoing and other disadvantages of known automatic registration systems and methods.

In accordance with one aspect of the invention, spaced reference marks are applied to a running web at a first station in accordance with the location of a first processing operation performed by that station and a control mark is applied to the web at a second station in accordance with the location of a second processing operation performed by the second station. A first quantity representative of the spacing between the reference marks is measured, and a second quantity representative of the position of the control mark with respect to one of the reference marks is measured. The first and second quantities are then analyzed to detect misregistration.

In accordance with another aspect of the invention, groups of marks are successively applied to a running web, each group comprising a plurality of reference marks applied in accordance with the location of a first processing operation performed on the web by a first station, and a plurality of control marks respectively corresponding to the locations of other operations performed on the web by a plurality of other stations. Quantities representative of the separations between successive marks are measured beginning at an arbitrary mark and continuing for a predetermined number of marks, and the quantities are stored. The stored quantities are then analyzed to detect the start of a group of marks and the stored quantities associated with the marks of the detected group are analyzed to detect misregistration.

In accordance with still another aspect, the invention provides a registration control apparatus and method for multi-color printing, wherein each of a plurality of printing stations prints a different color mark on a running web. A light beam is imaged onto the web so as to be intercepted by the marks, and the amount of light reflected is detected. When a mark enters the beam and the amount of reflected light changes to a predetermined level, a first quantity representative of the time that the mark enters the beam is measured and stored. As the mark leaves the beam and the amount of reflected light changes beyond the predetermined level, a second quantity representative of the time that the mark leaves the beam is measured and stored. The first and second quantities are then employed to determine the midpoint of the mark. This avoids errors in determining mark positions caused by differences in the amount of light reflected by different color marks.

BRIEF DESCRIPTION OF THE DRAWINGS

FIGS. 5A and 5B are a detailed block diagram of a portion of a registration control apparatus in accordance with the invention.

DESCRIPTION OF THE PREFERRED EMBODIMENT

The invention is particularly well adapted for use in connection with multi-color printing presses, and will be described in that environment. However, it will become apparent that this is illustrative of only one utility of the invention and that the principles of the invention are applicable to other types of multi-station processing systems.

Figure 1:
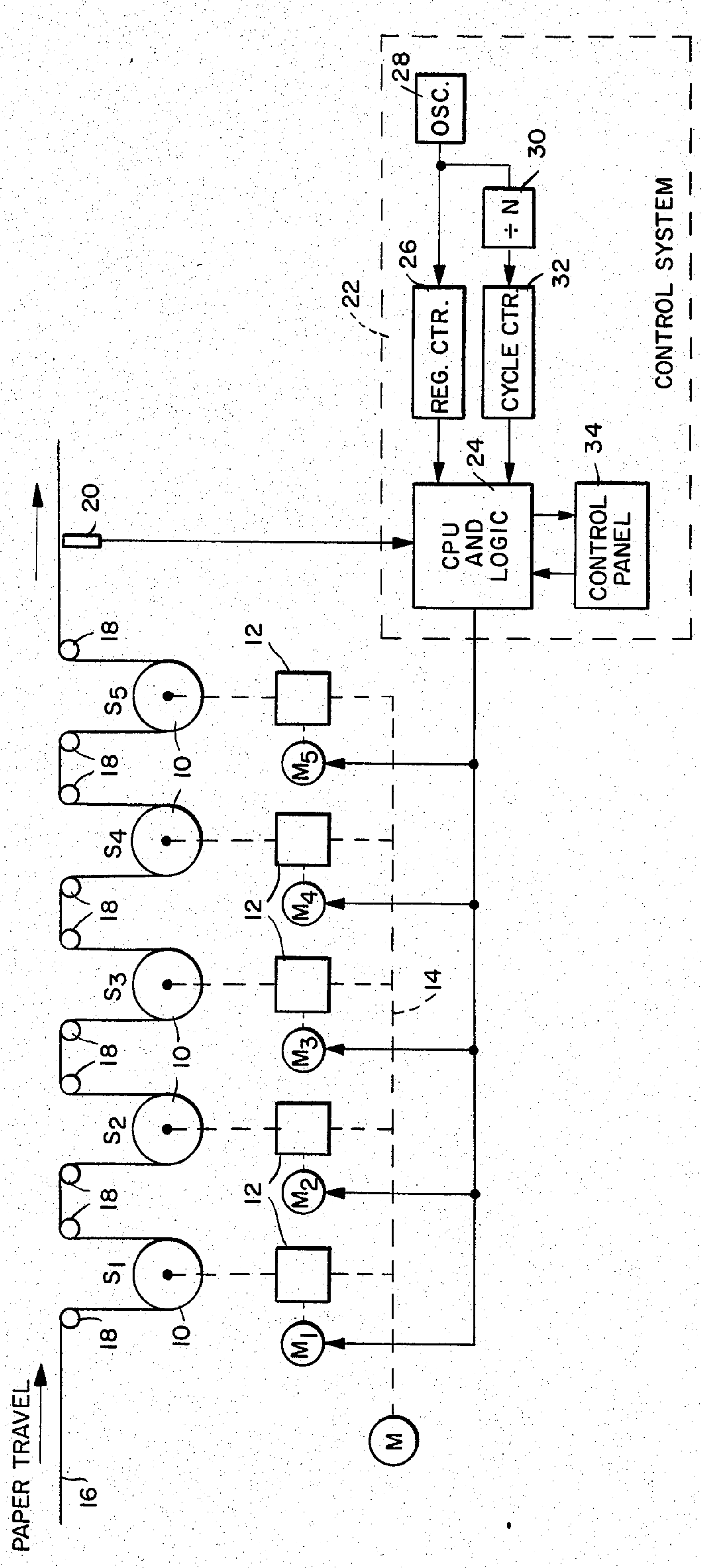
FIG. 1 is a diagrammatic view of a multi-station processing system embodying the invention.

FIG. 1 illustrates diagrammatically a multi-color printing press of the type with which the invention may be employed. For purposes of illustration, the press may have five printing stations S1–S5, although the invention may also be employed with presses having a smaller or greater number of printing stations. Each printing station comprises a rotatable print platen 10 connected via a differential gear 12 to a common drive shaft 14 (illustrated by the dotted lines in the figure) that is driven by a main drive motor M. The platens are rotated in synchronism by the drive shaft. A servomotor M1–M5 connected to each differential gear enables the rotational position of an associated platen to be shifted with respect to the positions of the other platens. A running web of paper 16 is passed through the printing press in the direction of the arrows (by a mechanism not illustrated) and guided past each station as by a plurality of rollers 18. As noted earlier, each station prints a different color image on the running web such that when the successive images are properly aligned in overlapping relationship, i.e., registered, a composite image having the desired color and form is produced. One color, i.e., station, is arbitrarily selected as the reference color and the other colors are aligned to it by controlling the servomotors to adjust the positions of the images printed by their stations. The printing press may also include a dryer for drying the ink and a cutter for cutting the web into individual sheets. (The dryer and the cutter are not illustrated.)

In accordance with the invention, and as will be described more fully hereinafter, in addition to printing an image on the web, each station also prints one or more registration marks along an edge of the paper. The marks are arranged such that they have a predetermined relationship when registration is proper. Following the last station S5; a sensor 20 detects the registration marks and supplies signals representative of their positions to a control system 22, an overview of which is illustrated in functional block diagram form within the dotted lines.

As shown in FIG. 1, and as will be explained in more detail hereinafter, the control system may comprise a computer (CPU) and associated logic 24 which receives the output of a registration counter 26 driven by a fixed frequency oscillator 28. The oscillator output frequency is also divided down by a divide-by-N circuit 30 to drive a cycle counter 32 which is also supplied to the computer. The computer may also receive operator inputs from a control panel 34 and supply outputs to various indicators thereon. The control system analyzes the signals from the sensor and issues appropriate control signals to the servomotors of the stations being controlled to cause the registration marks to assume a predetermined relationship. Throughout a printing run, the control system monitors registration and makes whatever corrections are necessary to insure that proper registration is maintained.

Figure 2:
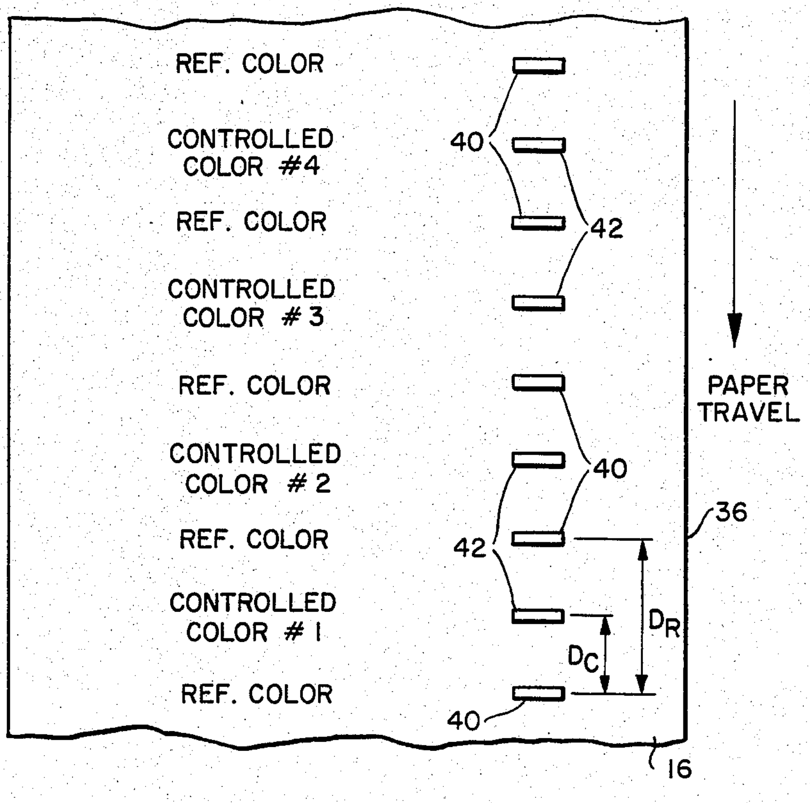
FIG. 2 is a diagrammatic view illustrating a registration mark arrangement in accordance with the invention.

FIG. 2 illustrates a preferred registration mark arrangement in accordance with the invention. The registration marks may be applied adjacent to an edge 36 of the running web in spaced groups (one such group being illustrated in FIG. 2) by the rotating print platens 10 of the printing press of FIG. 1, one group of marks being applied for each revolution of the platens. As shown, the group of registration marks may comprise a series of reference color registration marks 40 spaced a predetermined distance Dr, e.g., one inch, apart, and a series of controlled color registration marks 42, each being positioned midway (or at some other predetermined location) between a different pair of reference marks. The reference color marks 40 are all applied to the running web by the "reference" station that prints the selected reference color. A single controlled color mark 42 is applied to the web by each of the "controlled" stations which is to be aligned to the reference station. For printing five colors, the reference station will apply five spaced reference marks to the web (per group), providing four spaces for the four controlled color marks. In general, if N is equal to the total number of colors to be printed, then the composite number of marks M per group (platen revolution) is given by $$M=2N-1. \tag{1}$$

As noted above, any color may be selected as the reference color; and any station may be selected as the reference station by placing the reference color printing plate on the platen of the selected station. Furthermore, as will be explained later, control panel 34 may include switches that designate which station prints which controlled color so that it is not necessary that controlled colors #1 to #4 be printed in any particular order or that a particular color be printed by any particular station. This enables the color plates to be placed on the platens in any sequence.

To insure proper registration it is neccessary to maintain each of the controlled color marks midway between its pair of reference marks such that the distance Dc (defined herein as the distance between the leading reference mark of a pair and the controlled color mark) is equal to Dr/2. Establishing the distance Dc between a leading reference mark and a controlled color mark while the web is in motion may be accomplished by comparing the time interval between the leading reference mark and the controlled color mark with the time interval between the leading reference mark and the succeeding reference mark. As will be described in more detail hereinafter, the time intervals may be measured by using the fixed frequency oscillator 28 and registration counter 26 of control system 22 for establishing a first count Cc corresponding to the time interval between the leading reference mark and the controlled color mark and a second count Cr corresponding to the time interval between successive reference marks. The displacement distance Dc is then given by $$Dc = \frac{Dr\,Cc}{Cr} \tag{2}$$

Since the displacement error E is zero when the controlled color mark is midway between the reference marks, the error may be expressed as $$E = \frac{Dr\,Cc}{Cr} - \frac{Dr}{2}. \tag{3}$$

The frequency of the oscillator should be selected so that at the fastest press speed the resolution of the error calculated in Equation 3 is equivalent to the desired registration resolution. Assuming a maximum press speed of 200 in/sec (1,000 ft/min) and a desired registration resolution of 0.001 inch, the oscillator frequency should be 200 KHz. From a practical standpoint, the maximum expected registration error will be of the order of ±0.125 inch. With the registration marks nominally spaced 0.5 inch apart, the maximum expected spacing between registration marks will thus be 0.625 inch. Registration counter 26, which is preferably a 16-bit counter, will reach its maximum count at the minimum press speed. Assuming a minimum press speed of 20 in/sec (100 ft/min) and an oscillator frequency of 200 KHz, the maximum count reached by the counter will be 6250, which is well within the 16-bit counter capacity.

For a five station printing press printing five colors (the press may be used for printing less than five colors) the system determines four registration error values E, one for each controlled color, and outputs control signals to the servomotors of the controlled stations to advance or retard the rotational positions of the controlled color platens to correct the errors. Generally, the servomotors are AC motors and each has associated therewith a pair of switches that enable the motor to be rotated in opposite directions to either advance or to retard the position of its associated platen. The sign of the error determines the direction of rotation required; and the amount that the platen is shifted is proportional to the period of time that the motor is energized, which is a function of the gearing of the motor to the platen. For example, a press may require five cycles of 60 Hz power to produce a platen shift corresponding to a color displacement of 0.001 inch. As will be described hereinafter, the control system is designed to convert the registration error E to "error counts" and to produce an "on" signal of approximately 1/60 sec (actually 1/65 sec in the preferred embodiment) for each error count. Accordingly, to produce a displacement of 0.001 inch, the computed error E must be multiplied by 5 (which may be thought of as the servo gain) to produce an on signal of 5/60 or 1/12 sec. To facilitate the use of the invention with different presses, switches may be provided on control panel 34 to enable the appropriate gain to be entered and stored as an 8-bit word. This gain value does not have to be precise, since the system will eventually zero out the error.

To afford a registration accuracy of 0.001 inch, the registration marks must be placed on their respective printing plates with an accuracy of one part in a thousand. If, in the process of photographically separating the colors for transfer to their respective printing plates, the reproductions are enlarged or reduced slightly, the registration marks when printed will not be spaced exactly 0.5 inch apart. However, the controlled color marks 42 will still be midway between the reference marks 40. Equation 3 shows that when the ratio Cc/Cr is equal to 0.5, the error E will be zero and is independent of the distance Dr. When the error is not zero, then the value of Dr acts as another gain multiplier for the servo error. However, this will not affect the final zero position. When the servo system gain is low, the system will be overdamped and may require several corrections to reach its final position. When the gain is high, some overshoot may occur, but the system will also quickly reach the correct position.

This insensitivity to the absolute spacing of the registration marks also enables the system to avoid errors due to dimensional changes in the paper. During printing, the paper may stretch somewhat due to the tension imparted to it by the rollers, or shrinkage may occur due to drying of the paper as it passes through a dryer. However, once the marks have been printed, dimensional changes in the paper affect only the absolute spacing of the reference marks, not their relative positions.

It should be noted that Equation 3 is independent of the operating speed of the press. Although the counts Cc and Cr are inversely proportional to press speed, their ratio will remain constant for different speeds. Moreover, the error calculated by Equation 3 is unaffected by speed variations, i.e., accelerations, which can be shown as follows.

The distance s that the paper travels per unit time t is given by $$s=\tfrac{1}{2}at^2+v_it \tag{4}$$

where a is the acceleration and $v_i$ is the initial velocity of the paper.

To determine the error due to an acceleration, assume an initial velocity of 20 in/sec and an acceleration of 5 in/sec$^2$, which is equivalent to the press operating at 100 ft/min and slowing down linearly to a full stop in four seconds (if the acceleration is negative) or, conversely, speeding up linearly from a full stop to 100 ft/min in four seconds (if the acceleration is positive). To determine the error for this acceleration, Equation 4 may be solved for a value of $t_1$ for a 0.5 inch distance (the time interval between a reference mark and a controlled color mark), and for a value of $t_2$ for a one inch distance (the time interval between reference marks). These values are $t_1=0.0249$ sec and $t_2=0.0497$ sec. The ratio of $t_1/t_2=0.501$, which corresponds to an error of 0.001 inch for the assumed velocity and acceleration. The assumed velocity, which corresponds to the preferred minimum design speed of the registration correction system, is a worst case error condition. At normal operating speeds, e.g., 300–700 ft/min, the press would have to have an acceleration equivalent to the press coming to a full stop in order of one second or less before an error of 0.001 inch would be produced. In effect, this demonstrates that as a practical matter the error determination is virtually independent of acceleration.

As noted earlier, when the printing plate is laid out, the registration marks must be precisely placed thereon and, in particular, the controlled color marks must be set precisely midway between the reference marks. In laying out the printing plate, the required precision may not be met, and even if it is, the printed product may not be precisely aligned. Accordingly, it is desirable to enable operator-controlled offsets to be entered into the system (via control panel 34) and to be taken into consideration in determining the regestration error E. This may be accomplished by allowing the offset to be added to Equation 3 so that $$E = Dr\left(\frac{Cc}{Cr}\right) - \frac{Dr}{2} + \text{OFFSET} \tag{5}$$

Since a servomotor moves the position of a controlled color mark, i.e., changes the value of Cc, in such a direction to make E=0, with an offset (which may be positive or negative) Cc must be changed by an amount which just compensates for the offset. Switches may be provided on control panel 34 to enable an 8-bit offset to be entered for each controlled color. This allows an offset range of ±0.127 inch, which is far in excess of what would normally be required.

The value of E given by Equation 5 is in units of inches. It is desirable to convert this value to error counts, for reasons which will be explained later, wherein a count of one is equal to an error of 0.001 inch. This may be accomplished by rewriting Equation 5 as $$E(\text{counts}) = \left[\frac{Cc}{Cr} \times 1000 - 500 + \text{OFFSET (counts)}\right] G \tag{6}$$

where E and OFFSET are expressed in counts corresponding to the number of 0.001 inch increments, and G is the aforedescribed gain. The parameter Dr drops out of the equation since it has a value of unity. The multiplier 1000 is used so that the final error calculated is an integral number having a units value equal to a controlled color shift of 0.001 inch, and 500 is subtracted in order to take into account the predetermined displacement of 0.5 inch (500/1000 in.) between registration marks. The computer calculates an error count value E from Equation 6 for each controlled station, and these values are used to control the on-times of the servomotors.

As previously noted, one factor limiting the accuracy with which registration can be controlled is the accuracy with which the positions of the registration marks can be determined. The inability to determine registration mark positions with the required degree of accuracy has been a major shortcoming of many known registration systems and methods, particularly in the printing industry where registration accuracies of the order of 0.002–0.003 inch are required and the registration marks are of different colors. In order to obtain such accuracies, it can be appreciated that the sensor mechanism employed for detecting the marks must be capable of producing an output indication at precisely the same relative location of each mark with respect to the mark sensor. The invention provides a system and a method capable of achieving this, as will now be described.

The invention employs a single registration mark sensor 20, which may be of conventional design, such as is available from Sick Optical Co., that images a focused beam of light onto the running web and detects the reflected light. When the detected light exceeds some predetermined threshold value (which may be adjusted by means of a potentiometer) the sensor outputs a preset voltage, e.g. 5 volts. When the detected light drops below the predetermined threshold, the output voltage from the sensor switches to another preset voltage, e.g., 0 volts, where it remains until the detected light increases above the threshold value. If the threshold value is set for a 10% change in the amount of light reflected from a white background, then an output signal (in the form of a voltage transition) is produced when the reflected light decreases below 90% of its white background level or increases above this level. The focused light beam from the sensor is preferably a rectangle having dimensions of the order of 1.5 mm×5 mm, and is imaged onto the web so as to be intercepted by the registration marks. The registration marks, which may all have the same size and shape, preferably have dimensions which are slightly greater than those of the light beam, for example 2 mm×7 mm. As the registration marks pass through the light beam, the amount of reflected light changes and corresponding output signals are produced by the sensor.

The positions of the registration marks cannot be accurately determined if only signals corresponding to the leading or trailing edges of the marks are employed. Since the marks are of different colors, they have different values of reflectance. Moreover, even the reflectance of a particular color can vary between different batches of ink, as well as with variations in the density of the ink placed on the paper. Also, the sensitivity of the sensor may vary non-linearly over the visible spectrum, or because of aging or voltage supply variations. Accordingly, the voltage transitions produced by the sensor will not always occur for the same relative position of the marks with respect to the sensor.

The invention avoids such problems in a novel manner that enables the midpoint of each registration mark to be precisely determined. This midpoint is then used as the mark's position. This is accomplished as follows.

Figure 3:
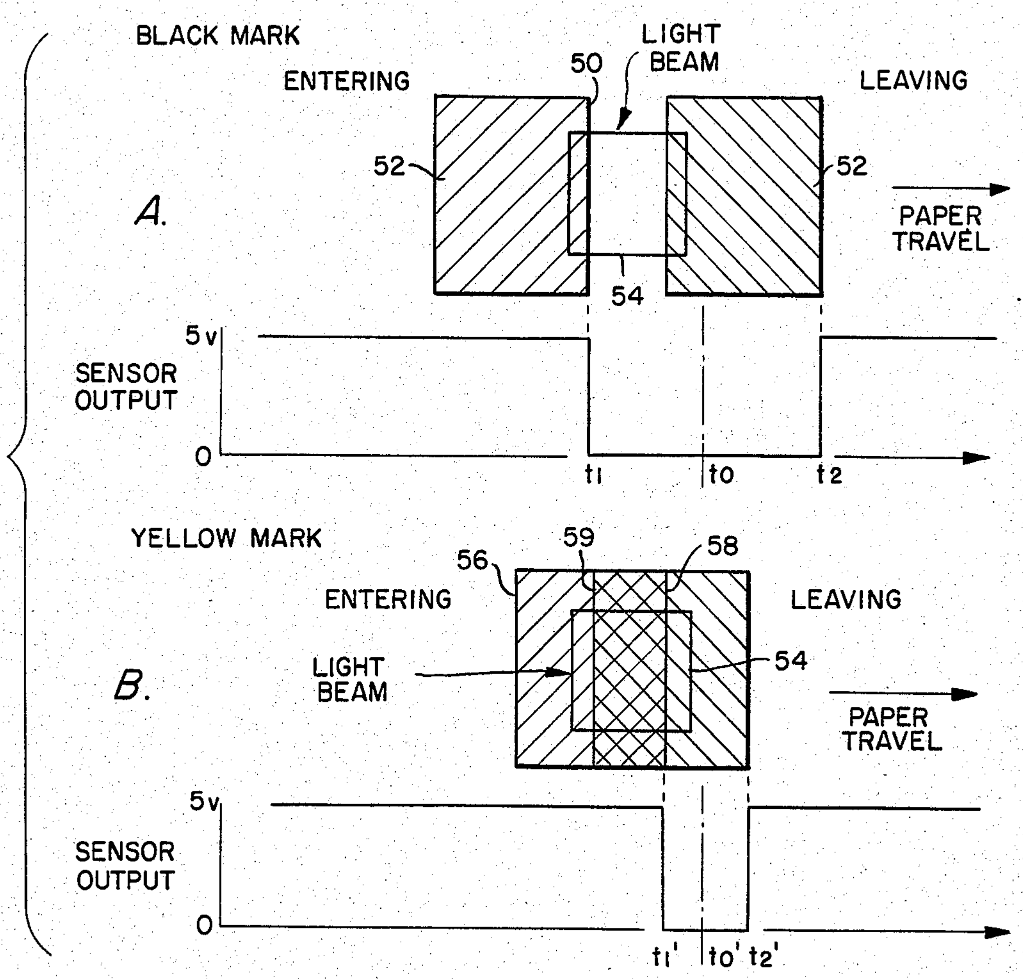
FIGS. 3A and 3B are views illustrating the operation of a registration mark sensor in accordance with the invention.

FIGS. 3A and 3B illustrate, respectively, the sensor output for a black and a yellow registration mark. The two illustrated positions of each mark correspond to the positions of the mark with respect to the light beam at which voltage transitions in the sensor output occur upon the mark entering and leaving the beam. In these figures, paper travel is assumed to be to the right and the sensor threshold is assumed to be set for a 10% change in detected light.

As shown in FIG. 3A, at time $t_1$, upon the leading edge 50 of a black reference mark 52 (which has a reflectance of approximately zero) entering the focused light beam 54 to a point where 10% of the light beam overlays the registration mark, the amount of reflected (and detected) light will decrease by 10% to the set threshold and the voltage output of the sensor will switch from 5 to 0 volts, as shown. Between times $t_1$ and $t_2$, the sensor output will remain at zero volts as the registration mark passes through the light beam, since the amount of detected light will be below the set threshold. At time $t_2$, as the registration mark leaves the light beam and the percentage of the beam area which overlays the mark decreases to 10%, the amount of detected light will exceed the threshold and the sensor output will switch back to 5 volts, as shown.

Referring to FIG. 3B, since the reflectance of the yellow mark 56 is quite high, the leading edge 58 of the yellow mark must enter the light beam sufficiently so that approximately 80% of the beam area overlays the yellow mark before the composite reflectance of the mark and the paper drops 10%. This occurs at time $t_1'$, at which the sensor output switches to zero volts. Between times $t_1'$ and $t_2'$, the sensor output remains low as the mark passes through the light beam. At time $t_2'$, as the trailing edge 59 of the mark moves to a point where the beam area which overlays the mark decreases to 80%, the detected light increases to the 10% threshold and the sensor output switches back to 5 volts.

As can be seen from FIGS. 3A and 3B, the "on-times" of the sensor (which in the figures are referenced to the leading edges of the marks) vary significantly for the two marks, and the sensor output voltage transitions occur at different relative times for the two marks. However, as shown in the figures, the midpoints $t_0$ and $t_0'$ of the sensor on-times for the two marks occur at precisely the same relative location of each mark with respect to the light beam and are independent of variations in mark reflectance. These on-time midpoints correspond to the midpoints of the registration marks and are employed for establishing mark positions for registration purposes.

In order to establish the midpoints of the registration marks, each time sensor 20 (see FIG. 1) produces a negative-going voltage transition (corresponding to the leading edge of a registration mark entering the light beam) computer 24 stores the current count C1 of counter 26. When the sensor next produces a positive-going voltage transition (as the registration mark leaves the light beam) the computer again stores the current count C2 of the counter and then calculates the average value of the two counts C1 and C2. This average value, which corresponds to the midpoint of the mark, is assigned as the mark position and is stored. This process is repeated for each registration mark, and the stored average values are employed for calculating counts Cc and Cr used in Equation 6.

After a correction is made, the system must wait until the corrected part reaches sensor 20 before registration is rechecked. Considering the actual paper path in a typical press of the type shown in FIG. 1, a minimum paper length of the order of 85 feet must be allowed to pass the sensor before the effect of a correction at station $S_1$ can be observed. It is possible to use a fixed time delay between measurements, but this slows the system down unnecessarily since the fixed delay must be selected to be at least long enough to accommodate the minimum press speed. Assuming a distance of 100 feet is chosen as the distance between measurements (allowing a safety factor for different presses), then at a speed of 100 ft/min the fixed delay would be one minute. The invention avoids this by setting a time delay between measurements that automatically takes into consideration the velocity of the paper. This is accomplished as follows.

The counts Cr (and Cc) are inversely proportional to paper speed since the distance between successive reference marks is constant. By setting up a subroutine within the computer which causes the computer to idle for a fixed period of time that is independent of velocity, and by repeating this subroutine Cr (or Cc) times, the total time interval between measurements can be made equal to 100 feet of paper. More specifically, the velocity v of the paper is $v=K/Cr$, where K is a constant that is dependent on the frequency of the oscillator and the fixed difference between successive reference marks. If Td is the subroutine execution time, and the subroutine is repeated Cr times, the total time interval is $Tc=Cr\times Td$, during which time interval the paper moves a distance $D=v\times Tc$, or rearranging, $D=K\times Td$, which is independent of velocity.

Since the system measures registration only periodically, some means must be provided to enable the system to identify the registration marks so that the individual marks can be associated with their appropriate stations. The invention provides a particularly convenient way of accomplishing this, as will now be described.

Figure 4:
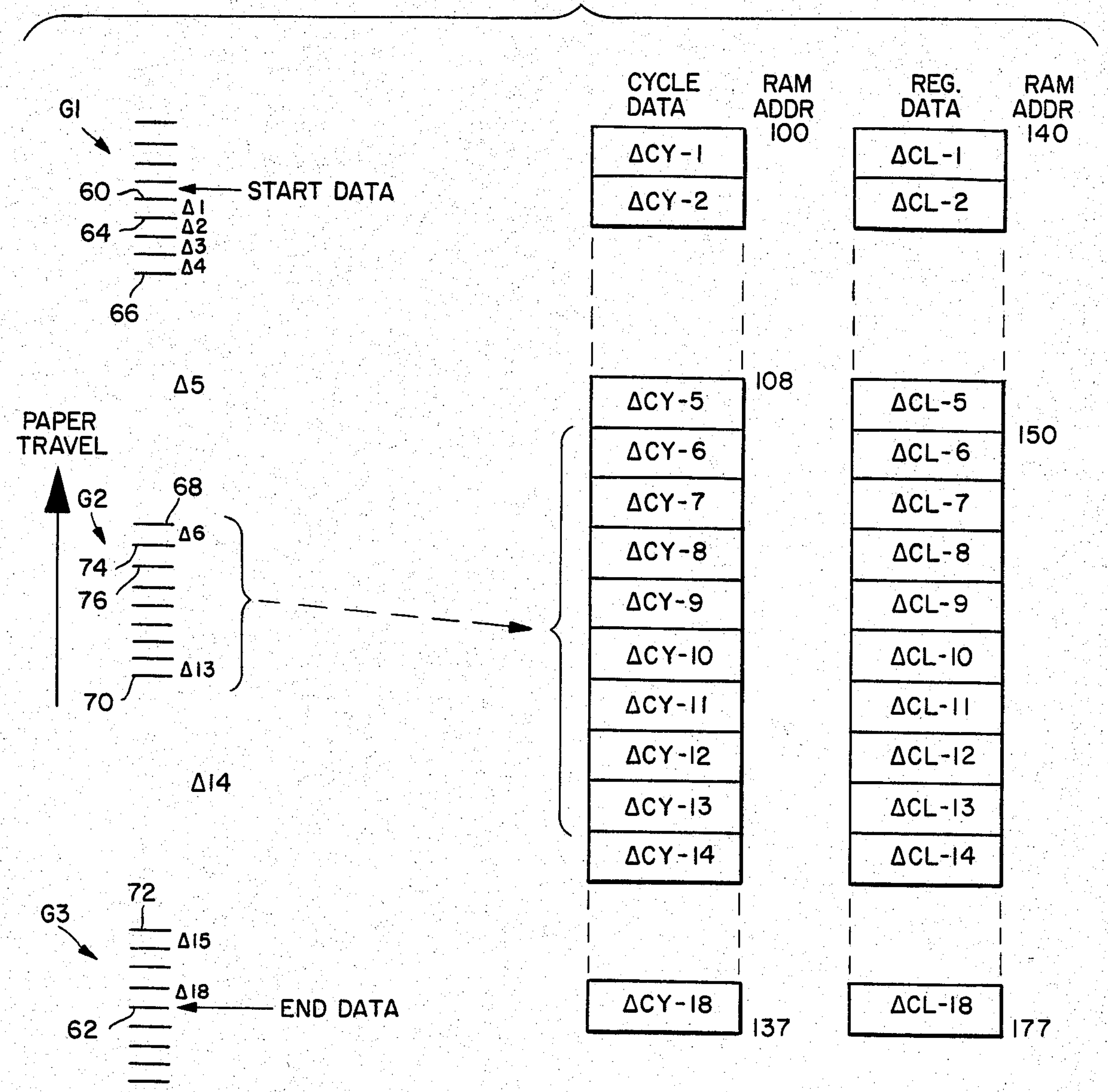
FIG. 4 is a diagrammatic view useful in illustrating the operation of the invention.

As noted earlier, the registration marks are placed on the paper in groups, one group per platen revolution, and the number of marks in the group is dependent upon the total number of stations being used. For five colors there are nine marks per group and they occupy a linear distance of approximately four inches. For a minimum page size of eight inches, the distance between the last registration mark of one group and the first registration mark of a succeeding group will be at least four inches, which is much greater than the spacings between successive registration marks of a group. FIG. 4 illustrates three successive groups G1–G3 of registration marks such as may be applied by a five station printing press.

In accordance with the invention, after a halt cycle (during which time the system idled to enable a previous correction to reach the sensor) or upon the initial collection of registration data, the system enters a data collection mode and begins collecting registration data at an arbitrary mark, for example, mark 60 in group G1, as indicated in FIG. 4. The system then collects data for a predetermined number of registrations marks equal to 2M+1, where M is the number of registration marks per group. For a five station press and nine registration marks per group, the system collects data for 19 successive registration marks, ending at mark 62 in group G3. The system analyzes the collected data to determine the start of a group (in a manner which will be described shortly) and then analyzes the data for the marks of that group to determine registration.

As previously noted, control system 22 includes a cycle counter 32 driven by oscillator 28 via a divider 30 that divides the oscillator frequency by a fixed number N, e.g., 25. The outputs of both the registration counter 26 and the cycle counter 32 are supplied to computer 24. Both counters produce counts corresponding to the spacings between registration marks. The cycle counter, which runs at a much lower rate than the registration counter, produces data that is employed for establishing the start of a group of marks. The registration counter, which runs at a rate sufficient to provide the desired registration resolution, produces data that is employed for determining the precise spacings between registration marks of a group for registration purposes.

Referring to FIG. 4, assume that the system enters the data collection mode just prior to the occurrence of registration mark 60. When the leading edge of the registration mark 60 is detected, the computer reads the count values of both the registration counter and the cycle counter (both preferably being 16 bits) and temporarily stores these counts. When the trailing edge of the mark is detected, the computer again reads both counters. It then adds the corresponding leading and trailing edge counts of each counter and divides these numbers by two to determine two midpoint counts for the registration mark (as previously described), and the midpoint counts are stored in the computer RAM. This process is repeated for each of the nineteen registration marks. The computer then calculates two sets of eighteen delta values corresponding to the separations between successive marks, one set based on the cycle counter and one set based on the registration counter. The delta values are then stored at predetermined RAM addresses. For example, as shown in FIG. 4, the spacing Δ1 between the first and second registration marks 60 and 64 is converted to a cycle counter delta value ΔCY−1 and a registration counter delta value ΔCL−1. These delta values are preferably stored at RAM address locations 100 and 140, respectively, using two 8-bit storage locations for each 16-bit delta. The counter delta values corresponding to the spacings between successive registration marks are preferably stored in successive address locations, the eighteen cycle counter deltas being stored at addresses 100–137, and the eighteen registration counter deltas being stored at addresses 140–177, as shown.

The system then analyzes the stored cycle counter delta values to determine the start of a group of registration marks. Since the number of registration marks detected is the equivalent of two platen revolutions plus one registration mark, there must be two and only two delta values which are considerably larger than the other delta values, regardless of which registration mark was first detected in the data gathering sequence. These large delta values correspond to the spacings between registration mark groups. In FIG. 4, the first such large delta value ΔCY−5 corresponds to the spacing Δ5 between the last registration mark 66 of group G1 and the first registration mark 68 of G2. The second large delta ΔCY−14 corresponds to the spacing Δ14 between the last registration mark 70 of group G2 and the first registration mark 72 of group G3. The system then selects the maximum delta value (Δ5 and Δ14 may not be exactly equal) arbitrarily divides this value by two, and then examines all eighteen delta values to insure that there are two and only two delta values that are greater than $\frac{1}{2}$ times the maximum delta value. If this check is not met, it may mean that the waste edge of the paper has been smudged; and the system then lights an appropriate alarm lamp on control panel 34 and exits to the "panel data input routine", which will be described hereinafter. Next, knowing the addresses in RAM where the two large delta values are stored, the system determines the number of other delta values stored between these locations by subtracting the two addresses, subtracting one from the result, and dividing by two. This final number should equal the number of controlled colors and is checked against the number of "on" stations set by the operator, as later described. If there is no match, the system will illuminate another alarm lamp and exit to the panel input data routine.

Assuming that these checks are met, the system analyzes the stored registration counter delta values for the group G2. This is accomplished by adding 42 to the address location where the first large cycle counter delta value ΔCY−5 corresponding to Δ5 is stored (108 in the figure) to indicate the address (150) of the registration counter delta value ΔCL−6 corresponding to the spacing Δ6 between the first two registration marks 68 and 74 of group G2. This delta value ΔCL−6 is equal to Cc for the first controlled color. By adding this delta value to ΔCL−7, corresponding to the spacing between the second and third registration marks 74 and 76 of group G2, the value of Cr is established. Since these two delta values pertain to the first controlled color, the system will fetch the offset value for the first controlled color (which is stored at a predetermined RAM address), compute the error E using Equation 6, and store the result. This process will be repeated for the remaining three controlled colors using delta values ΔCL−8 to ΔCL−13.

As will be described shortly, each of the computed errors E is then analyzed to determine if any is greater than some predetermined value, e.g., 0.127 inch, which is significantly greater than the normally expected error. If any errors exceed this value, rather than making such a large correction, the system will light an alarm light and repeat the measurement using new data. Each of the errors may also be compared against an acceptable range setting (input by an operator). If any error exceeds the acceptable range setting, an alarm light may be illuminated so that the operator can identify that portion of the printed material. Once the data analysis is complete, the errors have been calculated and the appropriate checks performed, the system will determine which stations print which controlled colors from operator-entered information stored in predetermined RAM locations, and will then proceed to issue the appropriate correction signals to the servomotors to correct the errors. The computer will then idle and wait for 100 ft. of paper to pass before rechecking registration, as previously described.

Figure 5A:
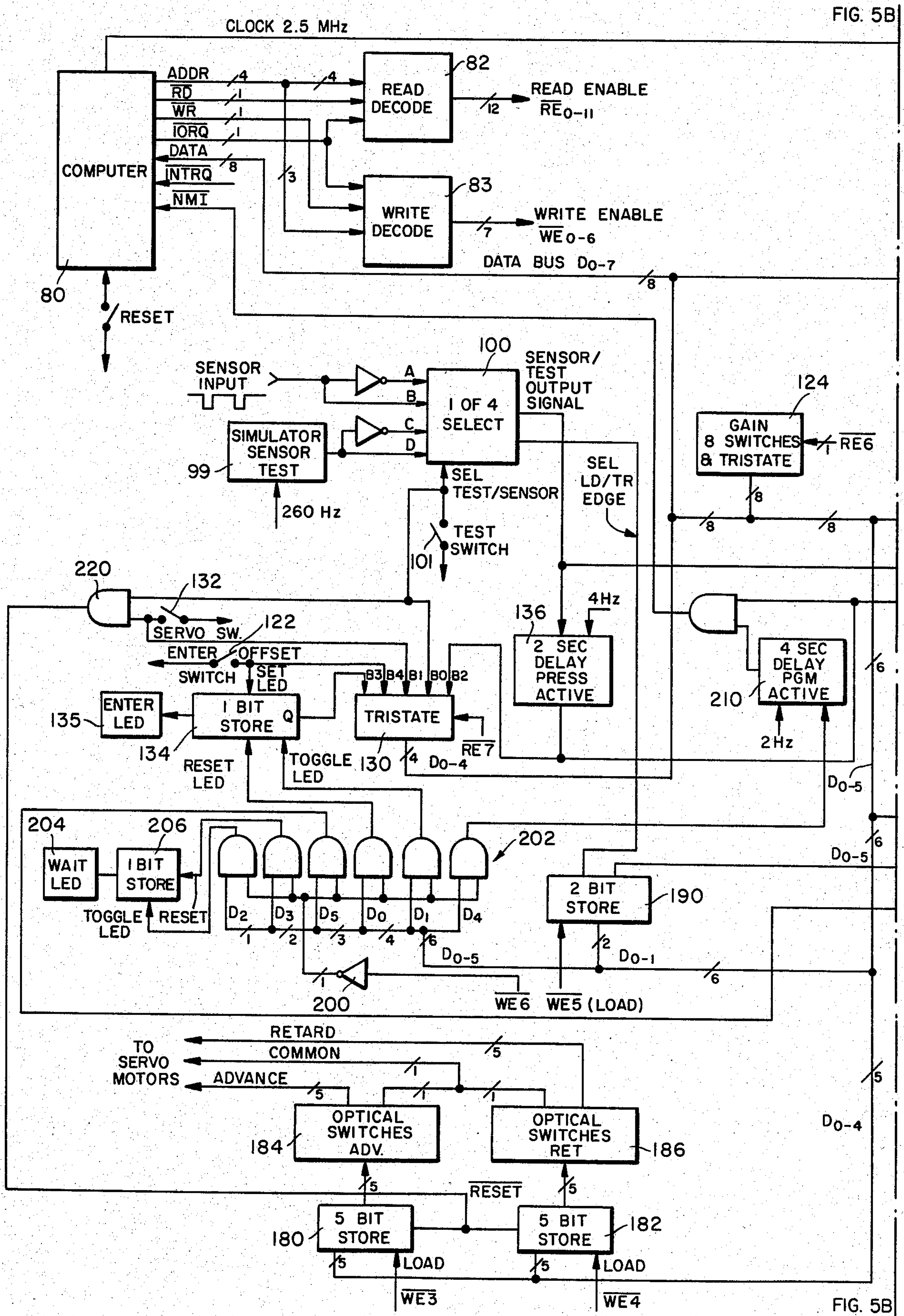

FIGS. 5A and 5B are a detailed block diagram of a preferred form of control system 22 of FIG. 1. As shown, the system is controlled by a computer system 80, such as a Model No. CPU-1, manufactured by MOSTEK, comprising a type Z-80 microprocessor, a PROM for storing control programs, a RAM, and a 2.5 MHz clock. Computer 80 controls the system operation and all information flow, as directed by the stored program. The computer outputs four address (ADDR) lines, a read signal ($\overline{RD}$) line, a write signal ($\overline{WR}$) line and an input/output request ($\overline{IORQ}$) to a read decode circuit 82 and to a write decode circuit 83, both of which may be conventional. The read decode circuit provides 12 read enable lines $\overline{RE0}$–e,ovs/RE/ 11, and the write decode circuit provides 7 write enable lines $\overline{WE0}$–$\overline{WE6}$. When the read decode circuit simultaneously receives a $\overline{RD}$, a $\overline{IORQ}$ and a ADDR (4 bits) signal, one of the 12 $\overline{RE}$ lines designated by the ADDR signal becomes active, i.e., goes low. Similarly, when a $\overline{WR}$, a $\overline{IORQ}$ and a ADDR (3 bits) signal are simultaneously received by the write decode circuit, one of six $\overline{WE}$ lines designated by the ADDR signal becomes active. As will be explained, each of the $\overline{RE}$ lines activates a particular tri-state driver which puts data onto data lines D0–D7 which is then read by the computer. Inputs to the drivers can come from any source, such as thumbwheel switches, push buttons, logic circuits, etc. Similarly, each of the write enable lines will strobe one or more latches which in turn store the information on the data lines which has been output by the computer. These latches can be used to light LED lamps, to activate optical switches for controlling the servomotors, etc.

The 2.5 MHz clock is divided by twelve in a divider 84 to produce a clock frequency of approximately 208 KHz which is applied to a 16-bit registration counter 86 and to an interrupt ($\overline{INTRQ}$) logic and load circuit 88. The output of divider 84 is also divided by twenty-five by a divider 89 and applied to a 16-bit cycle counter 90. (Registration counter 86 and cycle counter 90 correspond, respectively, to registration counter 26 and cycle counter 32 of FIG. 1.) Each of these counters provides data for two 8-bit latches and tri-state drivers 91, 92, 93 and 94, as shown. At the transition of a LOAD signal from circuit 88, the latches store the current count data from their respective counters, which can then be read by the computer as 8-bit words by successively activating read enable lines $\overline{RE8}$–$\overline{RE11}$.

The sensor input signal and its complement, as well as a simulator test signal from a simulator test generator 99 are applied to a 1-of-4 select circuit 100. Depending upon the position of a TEST switch 101, this circuit outputs a test or sensor signal to the $\overline{INTRQ}$ logic and load circuit 88 that serves as a registration interrupt (REG.INTRPT) signal. This produces a LOAD signal which causes the counter data to be loaded into the latches. The counters count on the negative transitions of the system clock, and the latches are loaded on the first positive transition of the clock following the receipt of an interrupt. This affords a delay of the order of 2.5 microseconds between the counters being strobed and the loading of data into the latches, which is more than adequate to allow for settling of the counters. The REG.INTRPT signal also produces an $\overline{INTRQ}$ signal to the computer, which then issues read enable signals to read the data stored in the latches, as will be described more fully hereinafter. This process will continue until the predetermined number of registration marks has been read. The computer will then ignore further interrupts until this data has been analyzed, the error is computed, and the appropriate corrections made.

Various operator-controlled parameters may be entered into the system from control panel 34 (FIG. 1) as follows. A first group of four tri-state drivers 104 receives data from four associated STATION SELECT thumbwheel switches 106 that correspond to the controlled color sequence #1 to #4. Each switch produces a binary coded number where a "1" corresponds to zero volts. These numbers designate the stations that print controlled colors #1 to #4, respectively. Three data lines are supplied from each switch 106 to its associated tri-state driver 104, as shown, and the drivers are read by read enable lines $\overline{RE0}$–$\overline{RE3}$. The data is stored in predetermined RAM locations and is used by the computer to associate each controlled color with the station that prints it. A second group of tri-state drivers 108, 110 and 112 receive data, respectively, from RANGE, OFFSET, and STA. thumbwheel switches 114, 116, 118 and 120, as shown. A $\overline{RE4}$ signal from the computer causes 4 bits of data from RANGE switch 114 to be placed onto data lines D4 to D7, and simultaneously causes 4 bits of data from station switch 120 to be placed onto data lines D0 to D3.

Read enable $\overline{RE5}$ causes data from the OFFSET thumbwheel switches 116 and 118 to be read onto the data lines. One bit (from switch 116) is for advance/retard and 4 bits are used for the magnitude of the offset value. This limits the magnitude of the offset to nine counts (0.009 inch). However, the offset can be re-entered any number of times for the same station by successively depressing an ENTER OFFSET switch 122 to provide a maximum offset of ±127 counts. In effect, the computer adds the new offset to the previously stored offset.

Read enable $\overline{RE6}$ reads the servo gain from a set of eight binary GAIN switches 124 and their associated tri-state drivers as an 8-bit word, which gives a range of 0 to 255 (zero gain is not permitted). The system employs a servo interrupt clock frequency of 65 Hz, which establishes the basic servo correction timing interval, and the value of the gain setting is determined by the equation $G=65T$, where T is the time interval in seconds for a station to move its registration mark 0.001 inch. The computed value of G is rounded to the nearest integer, and this value establishes the switch settings. Each of the switches has a predetermined value in the binary sequence 1, 2, 4 etc.

Read enable $\overline{RE7}$ reads five bits of data from tri-state driver 130. This data comprises the position of TEST switch 101, the position of a SERVO switch 132, the status of ENTER OFFSET switch 122, the status of a 1-bit store 134 (which drives the ENTER LED 135) and the status of a 2-second delay circuit 136. The 2-second delay circuit comprises a counter driven by a 4 Hz clock signal. Each time a signal is output from the select circuit 100, the signal resets the counter. If no signal is received within two seconds, the counter will time-out and produce an output voltage which will serve as an alarm signal. This occurs if the press stops, the sensors fail, or if the sensors are not properly positioned with respect to the paper to pick up registration marks.

The operator-controlled parameters entered by the various switches are read by the computer during the panel data input routine, as described later, and stored in its RAM. This data is used in calculating registration errors and generating appropriate correction signals, and for controlling various alarm functions of the system.

Considering now the functions performed by the write enable signals from write decode circuit 83, when $\overline{WE0}$ is active, the information on the data lines is loaded into a 4-bit store register 150, the output of which controls four STATION ON LED's 152, which indicate stations that are on for control purposes.

Write enable $\overline{WE1}$ loads data into a 4-bit store register 154 that controls four RANGE ALARM LED's 156, one for each controlled station, which are illuminated if the correction for any station exceeds the preset range entered by switch 114. $\overline{WE2}$ loads data into a 4-bit store register 160 which controls a group of LED's 162 employed for various system alarm functions. LED's 162 may include a DIAL LED for indicating an improper station select switch sequence, a COLOR LED for indicating either an incorrect sequence of registration marks or that the correction for any station exceeds 0.127 inch, and a SERVO LED which is illuminated any time the system is in a test mode or the servos are inhibited by switch 132. A SPEED LED 164 may also be provided and controlled by combining in an AND gate 166 one output from 4-bit store 160 with the output from the 2-second delay circuit 136. The reason for the SPEED LED is that if the press is operating at a speed of less than 100 ft/min, where the paper repeat cycle is less than approximately 40 inches, the 2-second delay may not time-out. However, the computer will calculate the precise velocity and activate the SPEED LED. Alternately, if the press is stopped and the computer has no information about its velocity, the 2-second delay will time-out and activate the LED.

Another AND gate 168 may combine the SPEED LED signal and the COLOR error signal to light a remote LED located near the sensor head whenever either of these signals is in an alarm condition. This is useful for enabling the operator to properly position the sensor head with respect to the registration marks. If the sensor is not properly positioned, the remote LED will be illuminated and the sensor can then be moved laterally across the running web until the registration marks are sensed, at which time the LED is extinguished.

After analyzing the registration data and determining which stations have to be repositioned and in which direction, i.e., advanced or retarded, the computer will output a $\overline{WE3}$ write enable signal, as well as data bits D0 to D4 designating those stations which are to be advanced, causing the data to be loaded into a 5-bit store register 180. The computer will also designate those stations which are to be retarded and issue a $\overline{WE4}$ to a 5-bit store register 182. The data in these two registers activate the appropriate optical switches 184, 186 to advance or retard the designated servomotors. Setting of the two 5-bit store registers occurs sequentially, but takes only approximately ten microseconds, so that the servomotors are essentially started simultaneously. If the error for a particular station is zero or the station is not being controlled, its respective data bit would be zero in both registers 180 and 182. The computer determines the time interval that each servomotor should be energized, which is proportional to the product of the error times the gain, as previously described. When a station is to be deenergized, the computer sets its respective data bit to zero and rewrites data into both 5-bit store registers.

Write enable $\overline{WE5}$ causes data bits D0 and D1 to be stored in a 2-bit store register 190. One output from this register (D0) is used to control the 1-of-4 select circuit 100 to select either the leading or the trailing edge of the sensor/test signal. A second output (D1) is used as a SELECT SERVO/REG INTRPT input to $\overline{INTRQ}$ logic 88 to cause the logic to select either the registration interrupt or the 65 Hz servo interrupt.

When the computer is ready to accept registration data, it will set data bits D0 and D1 to zero and reset the interrupt logic 88 via a $\overline{WE6}$ command (as will be described shortly). The leading edge of the non-inverted sensor signal will first be selected for output from circuit 100, and a registration interrupt from the interrupt logic will be selected. The computer will then halt and await an $\overline{INTRQ}$ signal, which occurs when the sensor/test signal goes from a high to a low value. This transition also causes a LOAD signal to be supplied to latches and tri-state drivers 91, 92, 93 and 94 to store data from counters 86 and 90.

On receiving the $\overline{INTRQ}$ signal the computer reads the stored counter data and outputs a $\overline{WE5}$ signal with D0=1 and D1=0, and again resets the interrupt logic by a $\overline{WE6}$ signal. D0 then selects the inverted sensor/test signal from circuit 100 (so that the trailing edge of the registration mark is a high to a low transition) and D1 again selects the registration interrupt mode. The computer than enters a halt state and awaits the interrupt caused by the trailing edge of the mark, at which time it again reads the counter data. This process is repeated until the appropriate number of registration marks have been read.

Write enable signal $\overline{WE6}$ is inverted by an inverter 200 and used in combination with data bits D0 to D5 to control a group of AND gates 202. These gates provide discrete outputs that perform several different functions. DO resets the ENTER LED via 1-bit store register 134. Data bit D1 toggles the ENTER LED light, i.e., if it is on, it turns it off and vice versa. Data bit D2 toggles a WAIT LED 204 via a 1-bit store 206, and data bit D3 resets the 1-bit store. The WAIT LED is turned on for the duration of the delay subroutine to enable a sufficient length of paper, e.g., 100 ft. to pass the sensor following a correction so the effect of the correction can be observed in the finished product. Data bit D4 is employed for resetting a 4-second delay counter 210, which is clocked by a 2 Hz clock signal. If a reset pulse is not received every 4 seconds, the counter will time-out and produce a non-maskable interrupt (NMI), forcing the computer to reset to the beginning of the program. The program will periodically execute a subroutine to reset this counter as long as the computer program is running properly. Data bit D5 is used for resetting the $\overline{INTRQ}$ logic 88. Once this logic has produced a LOAD and an $\overline{INTRQ}$ signal, it is inhibited from further action until reset.

Whenever the system is in a test mode (i.e., TEST switch 101 is closed, or SERVO switch 132 is closed), the servos are inhibited by an output from AND GATE 220 that resets 5-bit store registers 180 and 182, and holds them in the reset state. This prevents the servomotors from being activated, and effectively overrides the computer write commands to registers 180 and 182.

When the computer is first powered up or reset, the following functions are performed. First, all the offset RAM locations are cleared. All computer controlled LED's are energized for three seconds, permitting the operator to visually check that the indicator lamps are functioning. The computer then enters the panel data input routine.

In the panel data input routine, the servos are turned off, which is a safety feature. On the appropriate read enable signals from the computer, data is input from the color sequence STATION SELECT thumbwheels 106. This data is checked for duplicate numbers and for a skipped sequence i.e., one thumbwheel is zero but the succeeding thumbwheel is not. If either condition exists, the DIAL alarm LED 162 is illuminated. For each station that is not zero, the appropriate STATION ON LED 152 is illuminated. The computer then totals the number of active controlled colors and stores this information in RAM. It then calculates the total number of registration marks to be read for analysis of registration errors. This value is equal to $2M+1$, as previously described. Finally, the computer selects the registration mark interrupt, resets the interrupt logic, enables the computer interrupt, selects the leading edge of the sensor/test output signal and then halts to await the leading edge of a registration mark.

The system then collects registration data from counters 86 and 90 as previously described, analyzes this data to detect the start of a group of registration marks, and analyzes the data for the marks of the group to calculate the errors. The stored data entered by STATION SELECT thumbwheels 106 that designate which stations print which controlled colors will then be obtained. Registers 180 and 182 will then be loaded with data designating stations which are to be advanced or retarded, respectively, and the servomotors will be energized for 1/65th of a second. The computer then subtracts one from all positive errors and adds one to all negative errors. The errors are then reexamined. If they are all zero, the computer enters the delay subroutine (as previously described) before rechecking registration. If, however, all errors are not zero, the computer resets the interrupt logic and reloads the 5-bit store registers 180 and 182 to control the servomotors for another 1/65th of a second. This process continues until all errors are zero. In effect, the errors are counted down (if positive) or up (if negative) at a 65 Hz rate.

In the delay subroutine, the computer loads one of the count values Cc into a register, executes a fixed delay routine, and counts down Cc by one. This process is repeated until $Cc=0$. To produce a paper length of 100 feet, the fixed delay routine should be $T_d=1200/208{,}000=5.8$ msec, where 208,000 is the counter clock frequency.

As can be appreciated from the foregoing, the invention has a number of significant features and advantages. For example, the invention employs a single sensor for detecting registration marks, thereby avoiding sensitivity, interference and inexact spacing problems characteristic of many known registration systems and methods. The registration marks are detected in such a manner that errors caused by differences in the amount of light reflected by different color marks are avoided and such that the same relative position of each mark with respect to the sensor, e.g., the mark's midpoint, is used for establishing the mark's position. Moreover, the mark arrangement of the invention avoids errors resulting from dimensional changes in the paper and inexact spacing of reference marks, and avoids the necessity for continuous synchronization with the running web by enabling marks to be readily associated with their respected stations.

While a preferred embodiment of the invention has been shown and described, it will be apparent to those skilled in the art that changes can be made in this embodiment without departing from the principles and spirit of the invention, the scope of which is defined in the appended claims.

What is claimed is:

1. A method of registration control in a multi-station processing system, comprising applying to a running web at a first station a pair of reference marks in accordance with a location on the web of a first processing operation performed by said first station, said reference marks being spaced along the length of the web; applying to the web at a second station a control mark in accordance with a location of a second processing operation performed by said second station, said control mark being applied between said reference marks; measuring a first quantity dependent upon the space between said reference marks; measuring a second quantity dependent upon a position of the control mark with respect to one of the reference marks; and analyzing the first and second quantities to detect misregistration.

2. The method of claim 1, wherein the control mark is applied at a predetermined location between the reference marks when there is no misregistration.

3. The method of claim 2, wherein said measuring of said first quantity comprises measuring a first time interval between said reference marks passing a predetermined point to produce said first quantity, and wherein said measuring of said second quantity comprises measuring a second time interval between said control mark and said one reference mark passing said predetermined point to produce said second quantity.

4. The method of claim 3, wherein said analyzing comprises comparing a ratio of said second to said first time intervals with a predetermined number representative of a ratio of a distance between said one reference mark and said control mark to a distance between said reference marks.

5. The method of claim 4, wherein said predetermined location of said control mark is midway between said reference marks and said predetermined number is 0.5.

6. The method of claim 1, further comprising adjusting the second processing operation until the first and second quantities have a predetermined relationship.

7. The method of claim 6, wherein said measuring of said first quantity comprises detecting said reference marks at a predetermined point in the system, wherein said measuring of said second quantity comprises detecting said control mark at the same predetermined point in the system, and wherein, following said adjusting, the measuring and analyzing steps are repeated after a predetermined length of the web moves past said predetermined point.

8. The method of claim 7, wherein said detecting comprises detecting a leading edge and a trailing edge of each of said marks and determining therefrom a midpoint of each of said marks, and wherein the midpoints of marks are employed to measure said first and second quantities.

9. The method of claim 1, further comprising applying to the web at each of a plurality of further stations a further control mark in accordance with a location of a processing operation performed by each further station, said further control marks being spaced along the length of the web; and further comprising determining the position of each further control mark relative to a reference mark.

10. A method of registration control in a multi-station processing system comprising successively applying to a running web groups of marks, the marks being spaced along the length of the web, each group comprising a plurality of reference marks applied in accordance with the location on the web of a first processing operation performed by a first station and a plurality of control marks respectively corresponding to the locations of other processing operations performed on the web by a plurality of other stations; measuring quantities dependent upon separations between pairs of said reference marks; and measuring quantities dependent upon separations between each control mark and one of said reference marks; storing the measured quantities; and analyzing the stored quantities to detect misregistration.

11. The method of claim 10, wherein measuring of quantities commences at an arbitrary one of said marks and continues for a predetermined number of said marks; wherein the reference marks are applied with a predetermined nominal spacing therebetween, and the control marks are each applied between a different pair of reference marks; wherein the stored quantities are analyzed to detect a start of a group by detecting two such quantities that are greater than other stored quantities; and wherein said analyzing to detect the start of a group further comprises determining that there are only two stored quantities greater than a predetermined portion of a larger stored quantity and that the number of quantities stored between said two stored quantities corresponds to the total number of marks in each of said groups.

12. A method of registration control in multi-color printing wherein each of a plurality of printing stations prints a different color registration mark on a running web and positions of the marks are detected to determine registration, comprising imaging a light beam onto the web so as to be intercepted by the marks; detecting light reflected from the web; measuring and storing a first quantity representative of a time, as each mark enters the beam, that the amount of light reflected changes to a predetermined level; measuring and storing a second quantity representative of a time, as said mark leaves the beam, that the amount of light reflected changes beyond said predetermined level; and determining from said first and second quantities a midpoint of said mark.

13. The method of claim 12, further comprising employing the midpoint of each mark as a position of the mark for detecting registration.

14. The method of claim 12, wherein said detecting comprises detecting all of said marks with a single sensor.

15. The method of claim 12, wherein one of said stations is a reference station that prints reference marks spaced along the length of the web, and each station other than said one station is a controlled station that prints a control color mark between reference marks.

16. Apparatus for registration control in a multi-station processing system comprising first means for applying to a running web a pair of reference marks in accordance with a location on the web of a first processing operation performed by a first station, said reference marks being spaced along the length of the web; second means for applying to the web a control mark in accordance with a location of a second processing operation performed by a second station, said control mark being applied between said reference marks; means for measuring first and second quantities dependent, respectively, on the space between said reference marks and the position of the control mark with respect to one of the reference marks of said pair; and means for analyzing the first and second quantities to detect misregistration.

17. The apparatus of claim 16, wherein said measuring means comprises a sensor for detecting all of said marks at a single predetermined point and for producing corresponding output signals.

18. The apparatus of claim 17, wherein said measuring means further comprises counter means and means responsive to said output signals for storing counts of said counter means having count values corresponding to spaces between marks detected by said sensor.

19. The apparatus of claim 17, wherein said measuring means further comprises means for measuring time intervals between marks on said web passing said single predetermined point.

20. The apparatus of claim 19, wherein said analyzing means comprises means for determining ratios of measured time intervals and comparing said ratios to a predetermined number.

21. The apparatus of claim 17, wherein said measuring means comprises means for determining a midpoint of each mark and employing mark midpoints for measuring said first and second quantities.

22. The apparatus of claim 17, wherein said analyzing means comprises means for determining the deviation of the control mark from a predetermined position between said reference marks and means for producing an error value corresponding to said deviation.

23. The apparatus of claim 22, wherein said second station includes means for adjusting the location of the second processing operation, and wherein said analyzing means comprises means for converting said error value to a correction signal and for supplying said correction signal to the adjusting means to reduce the error value substantially to zero.

24. The apparatus of claim 23, wherein said adjusting means has means that moves the location of said second processing operation a predetermined distance per unit period of time when the adjusting means is energized, and wherein said converting and supplying means converts said error value to a count value representing a number of unit periods of time that the adjusting means must be energized to correct said deviation.

25. The apparatus of claim 24, further comprising means enabling operator input to said analyzing means for selecting said unit period of time.

26. The apparatus of claim 25, wherein said enabling means includes means enabling an operator selected offset to be combined with said error value prior to converting to said correction signal.

27. The apparatus of claim 23, further comprising means for producing an alarm signal upon said error value exceeding an operator selected range.

28. The apparatus of claim 23, further comprising means for measuring a predetermined length of the running web passing said sensor, and means operable upon the adjusting of the second processing operation for causing the apparatus to wait until said predetermined length passes said sensor and then for checking registration.

29. The apparatus of claim 16, wherein said first means applies successive pairs of reference marks to the web, and wherein said apparatus comprises means for applying to said web at each of a plurality of further stations a further control mark in accordance with a location of a processing operation performed by each further station, said further control marks being spaced along the length of the web; and means for determining the position of each further control mark relative to a reference mark.

30. The apparatus of claim 29, wherein each of said second means and said further applying means applies a respective control mark between the marks of different pairs of reference marks.

31. The apparatus of claim 29, wherein said first, second, and further applying means apply respective marks to the web in successive groups of marks, each group including a plurality of reference marks and a plurality of control marks.

32. An apparatus for registration control in a multistation processing system, comprising means for successively applying to a running web groups of marks, said marks being spaced along the length of the web, each group comprising a plurality of reference marks applied to the web in accordance with a location of a first processing operation performed on the web by a first station and a plurality of control marks respectively corresponding to locations of other processing operations performed on the web by a plurality of other stations; means for measuring quantities dependent upon separations between pairs of said marks in each group; means for storing quantities measured by said measuring means; and analyzing means for analyzing quantities stored by said storing means to detect misregistration.

33. The apparatus of claim 32, further comprising means for determining a start of a group of marks from quantities stored by said storing means.

34. The apparatus of claim 32, wherein said measuring means comprises a sensor for detecting all of said marks at a single point of said apparatus and for providing corresponding output signals.

35. The apparatus of claim 34, wherein said measuring means further comprises counter means responsive to said output signals.

36. An apparatus for registration control in a multicolor printing system, wherein each of a plurality of printing stations prints a different color registration mark on a running web and the positions of the marks on the web are detected for registration, the apparatus comprising means for imaging a light beam onto the web so as to be intercepted by the marks; means for detecting light reflected from the web; means for measuring a first quantity dependent upon a time, as a mark enters the beam, that the amount of reflected light changes to a predetermined level and for measuring a second quantity dependent upon a time, as said mark leaves the beam, that the amount of reflected light changes beyond said predetermined level; means for storing said quantities; and means for determining from said first and second quantitites a third quantity corresponding to a midpoint of the mark.

37. The apparatus of claim 36, further comprising means employing the midpoint of each mark as a position of the mark for detecting registration.

38. The apparauts of claim 36, wherein said detecting means comprises means for detecting all of said marks with a single sensor.

39. The apparatus of claim 36, wherein one of said stations is a reference station that prints reference marks spaced along the length of the web, and each station other than said one station is a controlled station that prints a control color mark between reference marks.

* * * * *